United States Patent [19]

Marden et al.

[11] Patent Number: 5,538,768
[45] Date of Patent: Jul. 23, 1996

[54] LIQUID-CRYSTALLINE MATERIAL

[75] Inventors: Shirley A. Marden; David Coates, both of Dorset, Great Britain

[73] Assignee: Merck Patent Gesellschaft Mit Beschrankter Haftung, Darmstadt, Germany

[21] Appl. No.: 269,519

[22] Filed: Jul. 1, 1994

[30] Foreign Application Priority Data

Jul. 5, 1993 [EP] European Pat. Off. ............. 93110687

[51] Int. Cl.⁶ ............................ C09K 19/46; C09K 19/38
[52] U.S. Cl. .................. 428/1; 252/299.01; 252/299.63; 252/299.65; 252/299.66; 359/103; 359/105; 524/559; 524/205; 524/208; 524/285; 524/288
[58] Field of Search ...................... 524/205, 208, 524/285, 288, 293, 299, 367, 559; 252/299.01, 299.5, 299.63, 299.65, 299.66; 428/1

[56] References Cited

U.S. PATENT DOCUMENTS 5,384,069 1/1995 Yoshinaga ......................... 252/299.01

FOREIGN PATENT DOCUMENTS

| 0168043 | 1/1986 | European Pat. Off. . |
| 0292244 | 11/1988 | European Pat. Off. . |
| 0501563 | 9/1992 | European Pat. Off. . |
| 1556994 | 12/1979 | United Kingdom . |
| 1592161 | 7/1981 | United Kingdom . |
| 1603076 | 11/1981 | United Kingdom . |

*Primary Examiner*—Mark Nagumo
*Attorney, Agent, or Firm*—Millen, White, Zalano & Branigan

[57] ABSTRACT

The invention relates to a liquid-crystalline material in the form of an anisotropic gel consisting of a polymerized liquid-crystalline material and a low-molecular weight liquid-crystalline material, wherein the polymerized material (a) forms a permanently oriented network in the low-molecular liquid-crystalline material (b), characterized in that the low-molecular weight liquid-crystalline material (b) exhibits a cholesteric phase, and to a display cell with such a material.

10 Claims, No Drawings

LIQUID-CRYSTALLINE MATERIAL

SUMMARY OF THE INVENTION

The invention relates to a liquid-crystalline material in the form of an anisotropic gel comprising a polymerized monotropic or enantiotropic liquid-crystalline material and a low-molecular liquid-crystalline material, wherein the polymerized material, (a), forms a permanently oriented network in the low-molecular weight liquid-crystalline material, (b), characterized in that the low-molecular weight liquid-crystalline material, (b), exhibits a cholesteric phase.

The invention further relates to a display cell comprising two opposite plates, which are transparent to light, as substrates. Each of the plates is provided with an electrode, made of a material which is transparent to light, on the sides facing each other, said electrode carrying an orientation layer. The cell further contains a sealing material provided between the ends of the plates. A liquid-crystalline material is introduced into the space between the plates and the sealing material, the latter being, for example, in the form of a ring.

In European Patent Application EP 451 905, a liquid-crystalline material in the form of an anisotropic gel comprising a polymerized liquid-crystalline material and a low-molecular nematic liquid-crystalline material is described.

In accordance with the invention, a liquid-crystalline material as described in the opening paragraph is obtained, wherein polymerized material, (a), forms a permanently oriented network in the low-molecular liquid weight crystalline material, (b), characterized in that the low-molecular weight liquid-crystalline material exhibits a cholesteric phase. Preferably, material (b) forms a continuous phase around the network of material (a).

Preferred embodiments of the invention are:

a) a liquid-crystalline material wherein material (a) is polymerized from acrylates, epoxy compounds, vinyl ether compounds and/or thiolene compounds;

b) a liquid-crystalline material wherein material (b) is a liquid-crystalline medium comprising at least two components wherein at least one component is a mesogenic compound comprising a structural element selected from formulae (1) to (5):

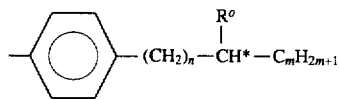  (1)

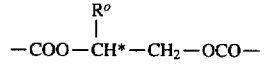  (2)

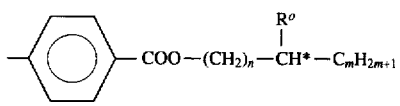  (3)

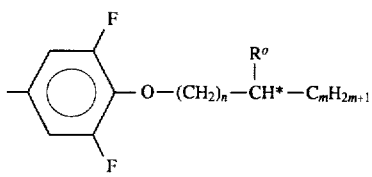  (4)

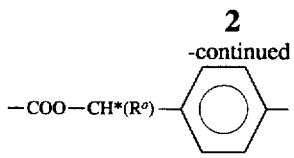  (5)

wherein $R^o$ is $CH_3$, $C_6H_5$, F, Cl, CN or $CF_3$, n is 0, 1 or 2, and m is an integer of 1–10;

(In general, mesogenic compounds contain 2 or more 6-membered rings, wherein adjacent rings are attached by a single bond or bridging group, and further provided with wing groups attached to the terminal ring structures. The 2 or more 6-membered rings are optionally laterally substituted);

c) a liquid-crystalline material wherein material (b) contains at least one compound of formula I $$R^1\text{-}(A^1\text{-}Z^1)_o\text{-}A^2\text{-}R^2 \quad (I)$$

wherein $R^1$ and $R^2$ are each independently straight-chained or branched alkyl or alkenyl with up to 16 C atoms, in which one or two non-adjacent $CH_2$ groups may be replaced by —O—, —CO—O—, —O—CO— or —O—CO—O— and is optionally substituted by Cl, one of $R^1$ and $R^2$ may also be H, F, Cl, $CF_3$, $OCF_3$, $OCF_2H$ or CN, preferably $R^1$ is alkyl or alkoxy with 1 to 7 C atoms, and preferably $R^2$ is CN, Cl or F, $A^1$ and $A^2$ are each independently optionally fluorinated 1,4-phenylene in which one or two CH groups may be replaced by N or 1,4-cyclohexylene in which one or two non-adjacent $CH_2$ groups may be replaced by O, preferably 1,4-phenylene optionally substituted by 1–2 F atoms or 1,4-cyclohexylene, $Z^1$ is —CO—O—, —O—CO—, —OCH$_2$—, —CH$_2$O—, —CH$_2$CH$_2$—, —C≡C—, —C≡C—C≡C— or a single bond, preferably —CO—O— or a single bond, o is 1, 2 or 3;

d) a liquid-crystalline material wherein the material (a) is produced from a polymerizable rod-like compound of the formula II $$R^4\text{-P-X-}A^3\text{-Z-}A^4\text{-}R^5 \quad (II)$$

wherein $R^4$ is $CH_2$=CW—COO—,

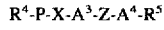

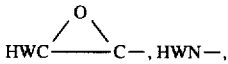, HWN—, $CH_2$=CH— or HS—$CH_2$—$(CH_2)_m$—COO— with W being H, Cl or alkyl with 1–5 C atoms and m being 1–7, P is alkylene with up to 12 C atoms, it being also possible for one or more non-adjacent $CH_2$ groups to be replaced by —O—, X is —O—, —S—, —COO—, —OCO— or a single bond, $R^5$ is an alkyl radical with up to 15 C atoms which is unsubstituted, mono- or polysubstituted by halogen, it being also possible for one or more $CH_2$ groups in these radicals to be replaced, in each case independently of one another, by —O—, —S—, —CO—, —OCO—, —CO—O— or —O—CO—O— in such a manner that oxygen atoms are not linked directly to one another, or alternatively $R^5$ has one of the meanings given for $R^4$-P-X-, $A^3$ is a 1,4-phenylene or a naphthalene-2,6-diyl radical which is unsubstituted or substituted with 1 to 4 halogen atoms, $A^4$ is (a) 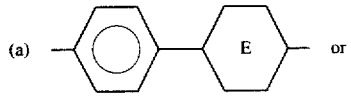 or (b) 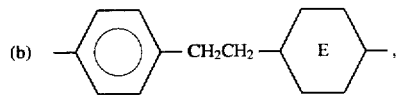, wherein

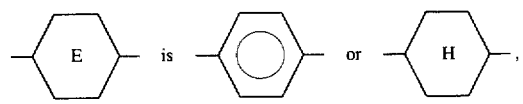

it being possible for radicals (a) and (b) to be substituted by CN or halogen and one of the 1,4-phenylene groups in (a) and (b) can also be replaced by a 1,4-phenylene radical in which one or two CH groups are replaced by N, Z is —CO—O—, —O—CO—, —CH$_2$CH$_2$— or a single bond, and halogen is F, Cl, Br or I, preferably F or Cl, especially F;

e) a liquid-crystalline material wherein the material (a) is produced from a bis-(meth)acrylate of formula IIA $$CH_2=\underset{R}{C}-\underset{O}{\overset{\parallel}{C}}-O[(CH_2)_t-A]_u-B-[A-(CH_2)_t]_u-O-\underset{O}{\overset{\parallel}{C}}-\underset{R}{C}=CH_2 \quad (IIA)$$

wherein

A is —O—, —CO—O—, —O—CO— or a single bond,

R is H, Cl or alkyl with 1–5 C atoms, preferably H or CH$_3$,

B is selected from —(CH$_2$)$_s$—,

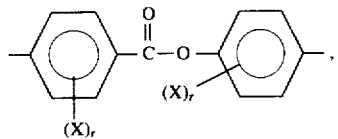,

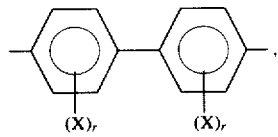,

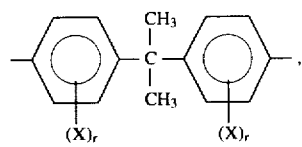,

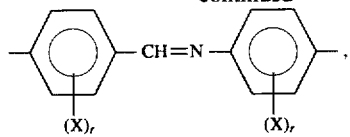,

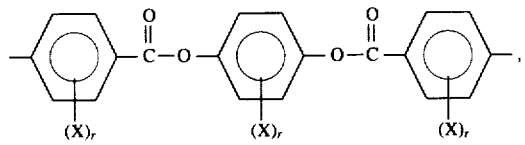,

X is CH$_3$ or F, r is 0, 1 or 2, s is an integer of 1–6, and t and u are each, independently, integers of 0–20.

f) A liquid-crystalline material wherein material (a) is present in the gel in a quantity of 1–50% by weight, in particular 2–10%, based on the total weight of the gel;

g) A liquid-crystalline material wherein the material (b) comprises at least one chiral mesogenic compound selected from formulae IV to VII

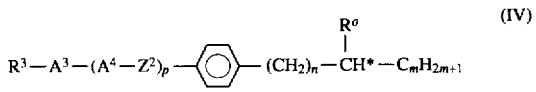 (IV)

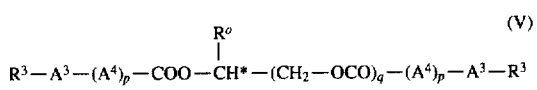 (V)

 (VI)

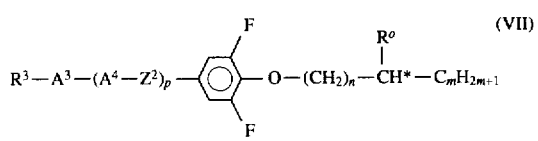 (VII)

wherein $R^o$, n and m have the meanings given in formulae 1–5, $R^3$ has the meaning given for $R^1$ in formula I, preferably $R^3$ is n-alkyl, n-alkoxy, CN or

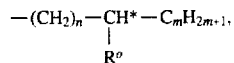, $A^3$ and $A^4$ have the meanings given for $A^1$ in formula I, preferably $A^3$ and $A^4$ are independently 1,4-phenylene or 1,4-cyclohexylene, $Z^2$ has the meaning given for $Z^1$ in formula I, preferably $Z^2$ is —CH$_2$CH$_2$—, —CO—O— or a single bond, p is 0, 1 or 2, and q is 0 or 1;

h) A liquid-crystalline material wherein the material (b) contains at least one chiral mesogenic compound selected from the formulae IV to VII wherein $R^o$ is CH$_3$ or C$_6$H$_5$.

The invention relates furthermore to a display cell comprising two opposite plates, transparent to light, as the substrates, wherein each of the plates are provided with an electrode, made of a material which is transparent to light, on the sides facing each other, said electrode carrying an orientation layer, and a sealing material provided between the ends of the plates. A liquid-crystalline material is introduced to the space between the plates and the sealing material. The liquid-crystalline material is preferably composed of at least two different liquid-crystalline materials, as described above, especially as described in embodiments a)–h) above.

The invention furthermore relates to a cholesteric liquid-crystalline medium comprising at least one achiral mesogenic compound of formula I $$R^1\text{-}(A^1\text{-}Z^1)_o\text{-}A^2\text{-}R^2 \qquad (I)$$

wherein $R^1$, $R^2$, $A^1$, $A^2$, $Z^1$ and o have the meanings described above, at least one chiral mesogenic compound of formula IV

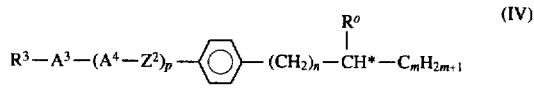

and at least one chiral mesogenic compound selected from formulae V, VI and VII:

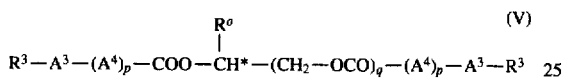

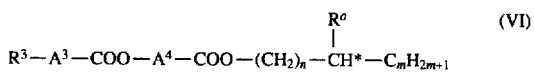

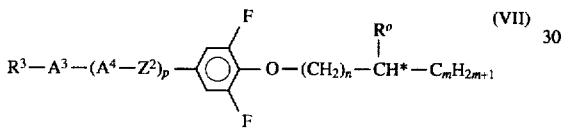

wherein $R^3$, $R^o$, $A^3$, $A^4$, $Z^2$, n, m, p and q have the meanings described above, in particular wherein $R^o$ denotes $CH_3$ for formulae IV, V, VI and VII and/or $R^o$ is $C_6H_5$ for formula V.

i) Preferred inventive cholesteric media are those described above containing at least one achiral mesogenic compound of formula I, at least one mesogenic compound of formula IV, and at least one chiral mesogenic compound of formulae V–VII, and in which:

50–88% of at least one, preferably 2 to 15, compounds of formula I,

1–30% of at least one, preferably 1, 2 or 3, compounds of formula IV, and (α) 0.1–10% of at least one, preferably 1, 2 or 3, compounds selected from formulae V and VI, and/or (β) 1 to 30%, in particular 10 to 25% of at least one compound of formula VII.

j) The cholesteric medium contains at least one achiral compound selected from formulae Ia to Ic

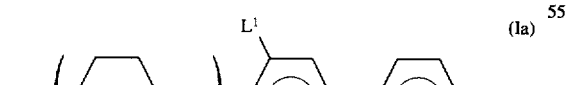

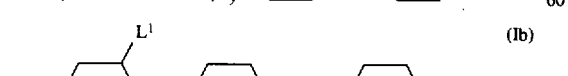

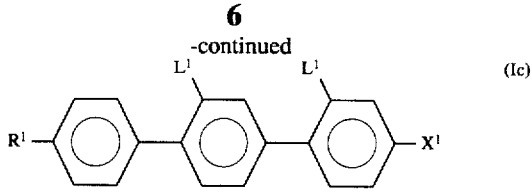

wherein
$R^1$ has the meaning given in formula I,
$L^1$ is H or F,
$X^1$ is F or Cl,
$Z^4$ is —COO—, —CH$_2$CH$_2$— or a single bond,

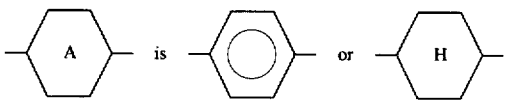

and
y is 0, 1 or 2.

k) The cholesteric medium contains at least one achiral compound selected from formulae Ia1–Ia4, Ib1, Ic1 and Ic2:

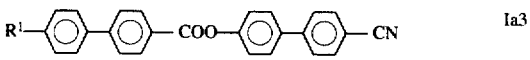

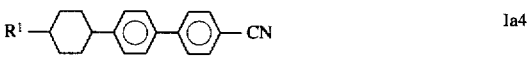

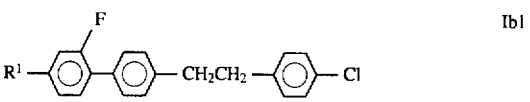

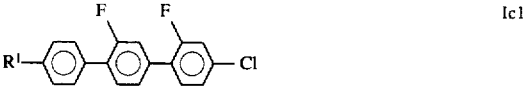

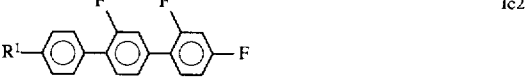

wherein $R^1$ has the meaning given in formula I and $L^1$ has the meaning given in formulae Ia–Ic.

l) The cholesteric medium contains at least one chiral compound selected from formulae IVa–IVb

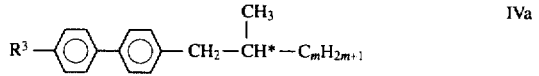

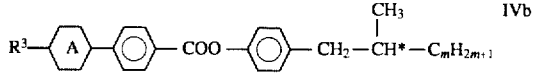

wherein $R^3$ has the meaning given in formulae IV–VII and m has the meaning given in formulae (1), (3) and (4), $R^3$ is preferably normal alkyl,

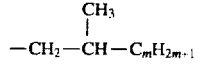

or CN, and at least one chiral compound selected from formulae Va, Vb, VIa and VIIa:

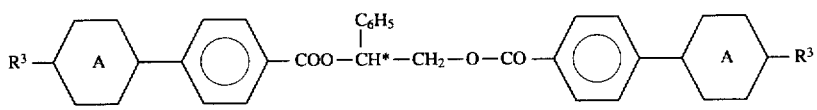  Va

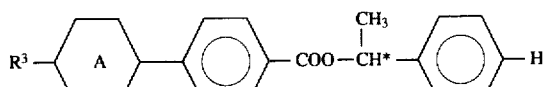  Vb

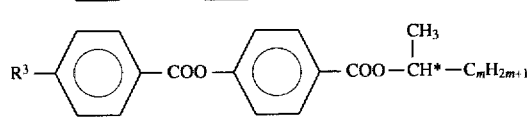  VIa

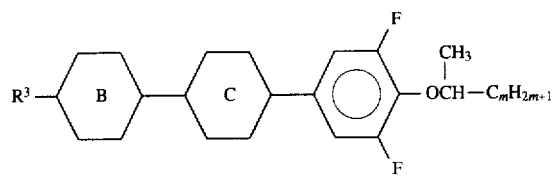  VIIa wherein $R^3$ has the meaning given in formulae IV–VII, m has the meaning given in formula (1), and

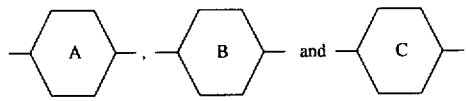

are each independently

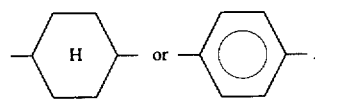

Mesogenic compounds comprising a structural element selected from formulae (1)–(4) are known or can be prepared analogously to known procedures. For example, compounds of formulae (1)–(4) and methods of preparing them are described in the following documents:

Formula (1)—GB 1,556,994, GB 1,592,161, GB 1,603,076 and EP 0 003 215;

Formula (2)—GB 1 603 076;

Formula (3)—EP 0 168 043; and

Formula (4)—DE 43 22 905.

The cholesteric liquid-crystalline media according to the present invention preferably are obtained by admixing a nematic base mixture containing at least one, preferably 2–15, compounds of formula I with a chiral premixture, a so-called chiral cocktail containing at least one compound of formula IV and at least one compound selected from formulae V to VII.

These chiral premixtures are a further aspect of the present invention.

Therefore, the invention also relates to a chiral premixture comprising at least one compound of formula IV and at least one compound selected from compounds of formulae V–VII, in particular at least one compound of formula VII.

In a preferred embodiment, the chiral premixture contains:

50 to 90% of at least one compound of formula VII 10 to 50% of at least one compound of formula IV, and 0 to 10% of at least one compound of formula V.

The acrylates of formula IIA1 are especially preferred as a component of the polymerizable material which makes up polymerized material (a),

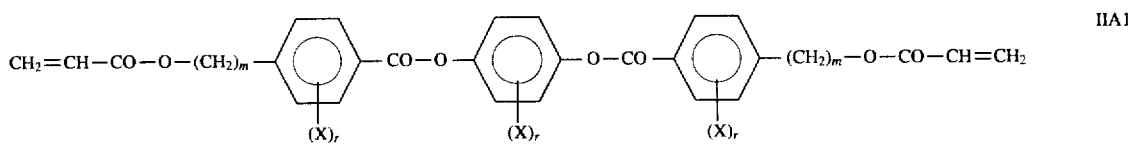  IIA1 wherein r is 0, 1 or 2 and m is 0–20, especially wherein r is 0 and m is 2.

Formula II encompasses reactive liquid-crystalline compounds with 3 rings of formula II1–II20

| | |
|---|---|
| $R^4$-P-X-Phe'-Z-Phe"-Phe"-$R^5$ | II1 |
| $R^4$-P-X-Phe'-Z-Pyd-Phe"-$R^5$ | II2 |
| $R^4$-P-X-Phe'-Z-Pyr-Phe"-$R^5$ | II3 |
| $R^4$-P-X-Phe'-Z-Phe"-Pyd-$R^5$ | II4 |
| $R^4$-P-X-Phe'-Z-Phe"-Pyr-$R^5$ | II5 |
| $R^4$-P-X-Phe'-Z-Phe"-$CH_2CH_2$-Phe"-$R^5$ | II6 |
| $R^4$-P-X-Phe'-Z-Pyd-$CH_2CH_2$-Phe"-$R^5$ | II7 |
| $R^4$-P-X-Phe'-Z-Pyr-$CH_2CH_2$-Phe"-$R^5$ | II8 |

| | |
|---|---|
| R⁴-P-X-Phe'-Z-Phe"-CH₂CH₂-Pyd-R⁵ | II9 |
| R⁴-P-X-Phe'-Z-Phe"-CH₂CH₂-Pyr-R⁵ | II10 |
| R⁴-P-X-Nap'-Z-Phe"-Phe"-R⁵ | II11 |
| R⁴-P-X-Nap'-Z-Pyd-Phe"-R⁵ | II12 |
| R⁴-P-X-Nap'-Z-Pyr-Phe"-R⁵ | II13 |
| R⁴-P-X-Nap'-Z-Phe"-Pyd-R⁵ | II14 |
| R⁴-P-X-Nap'-Z-Phe"-Pyr-R⁵ | II15 |
| R⁴-P-X-Nap'-Z-Phe"-CH₂CH₂-Phe"-R⁵ | II16 |
| R⁴-P-X-Nap'-Z-Pyd-CH₂CH₂-Phe"-R⁵ | II17 |
| R⁴-P-X-Nap'-Z-Pyr-CH₂CH₂-Phe"-R⁵ | II18 |
| R⁴-P-X-Nap'-Z-Phe"-CH₂CH₂-Pyd-R⁵ | II19 |
| R⁴-P-X-Nap'-Z-Phe"-CH₂CH₂-Pyr-R⁵ | II20 | wherein $R^4$, $R^5$, P, X and Z have the meanings given in formula II, Pyd denotes pyrimidine-2,5-diyl and Pyr denotes pyridine-2,5-diyl.

In the compounds of formulae II1–II10, Phe' denotes a 1,4-phenylene group

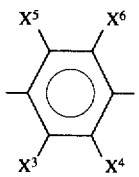

wherein $X^3$–$X^6$ denote independently from each other H or halogen, with halogen being F, Cl, Br or I, preferably F or Cl, especially F.

In the compounds of formulae II1–II20, Phe" is a 1,4 -phenylene group, which is unsubstituted or mono- or polysubstituted by CN or halogen, and in formulae II11–II20, Nap' is a naphthalene-2,6-diyl group

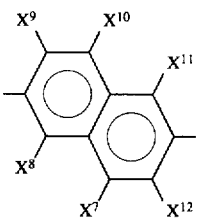

which is unsubstituted or wherein up to 4 of $X^7$–$X^{12}$ are, independently from each other, halogen while the other denote H.

Especially preferred as polymerizable material for material (a) are the compounds of formulae II1–II3, II6–II10, II13–II15, II18–II20, and in particular the compounds of formulae II1, II8, II15 and II20.

In the compounds of formulae II1–II20, $R^4$ is CH₂=CW—COO—, CH₂=CH—,

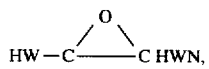

HS—CH₂—(CH₂)ₘ—COO— with W being H, Cl or alkyl with 1–5 C atoms and m being 1–7.

Preferably $R^4$ is a vinyl group, an acrylate group, an amino group or a mercapto group, and especially preferred are the following meanings of $R^4$:

| | |
|---|---|
| CH₂=CH—COO— | $R^4$-1 |
| CH₂=C—COO—<br>\|<br>CH₃ | $R^4$-2 |
| CH₂=C—COO—<br>\|<br>Cl | $R^4$-3 |
| CH₂=CH— | $R^4$-4 |
| H₂N— | $R^4$-5 |
| H(alkyl)N— | $R^4$-6 |
| HS—CH₂—(CH₂)ₘ—COO— | $R^4$-7 | wherein "alkyl" is $C_1$–$C_3$-alkyl and m is 1–5.

In the compounds of formulae II1–II20, the spacer-type group P is alkylene with up to 12 C atoms, it also being possible for one or more non-adjacent CH₂ groups to be replaced by O.

In case P is alkylene, P may be straight-chain or branched. Especially preferred alkylene groups are ethylene, propylene, butylene, 1-methyl-propylene, 2-methylpropylene, pentylene, 1-methyl-butylene, 2-methyl-butylene, hexylene, 2-ethyl-butylene, 1,3-dimethyl-butylene, heptylene, 1-methylhexylene, 2-methylhexylene, 3-methylhexylene, 4-methylhexylene, 5-methylhexylene, 6-methylhexylene, octylene, 3-ethylhexylene, nonylene, 1-methyloctylene, 2-methyloctylene, 7-methyloctylene, decylene, undecylene, dodecylene, 2-methylundecylene, 2,7,5-trimethyl-nonylene or 3-propyl-nonylene.

In case P is mono- or polyoxaalkylene, P may be straight-chain or branched. In particular, mono- or polyoxaalkylene groups for P are 1-oxa-ethylene, 1-oxa-propylene, 2-oxa-propylene, 1-oxa-butylene, 2-oxa-butylene, 1,3 -dioxa-butylene, 1-oxa-pentylene, 2-oxa-pentylene, 3-oxa-pentylene, 2-oxa-3-methyl-butylene, 1-oxa-hexylene, 2-oxa-hexylene, 3-oxa-hexylene, 1,3-dioxa-hexylene, 1,4-dioxa-hexylene, 1,5-dioxa-hexylene, 1-oxa-heptylene, 2-oxa-heptylene, 1,3-dioxa-heptylene, 1,4-dioxa-heptylene, 1,5-dioxa-heptylene, 1,6-dioxa-heptylene, 1,3,5-trioxa-heptylene, 1-oxa-octylene, 2-oxa-octylene, 3-oxa-octylene, 4-oxa-octylene, 1,3-dioxa-octylene, 1,4-dioxa-nonylene, 1,4-dioxa-decylene, 1,4-dioxa-undecylene and 1,3,5-trioxa-dodecylene.

X is —O—, —S—, —COO—, —OCO— or a single bond and in particular —O—, —COO—, —OCO— or a single bond. In case X is —O—, —S— or —OCO—, the adjacent CH₂-group of P is not replaced by —O—.

Z is —COO—, —OCO—, —CH₂CH₂— or a single bond. In the compounds of formulae II1–II7 and II15–II19, Z preferably is —COO—, —OCO—, —CH₂CH₂— or a single bond and, in particular, —COO—, —OCO— or a single bond. In the compounds of formulae II8–II14 and II20, Z preferably is —CH₂CH₂— or a single bond.

$R^5$ can be an alkyl radical with up to 15 C atoms which is unsubstituted, mono- or polysubstituted by halogen, it also being possible for one or more CH₂ groups in these radicals to be replaced in each case independently from one another by —O—, —S—, —CO—, —OCO—, —COO— or —O—COO— in such a manner that oxygen atoms are not linked directly to one another.

If $R^1$, $R^2$, $R^3$ and/or $R^5$ are each independently an alkyl radical or alkoxy radical, it may be straight-chain or branched. Preferably, it is straight-chain, has 2, 3, 4, 5, 6, 7 or 8 carbon atoms, and accordingly is preferably ethyl, propyl, butyl, pentyl, hexyl, heptyl, octyl, ethoxy, propoxy, butoxy, pentoxy, hexoxy, heptoxy or octoxy, and furthermore methyl, nonyl, decyl, undecyl, tridecyl, tetradecyl, pentadecyl, methoxy, nonoxy, decoxy, undecoxy, dodecoxy, tridecoxy or tetradecoxy.

If $R^1$, $R^2$, $R^3$ and/or $R^5$ are each independently oxaalkyl, it may be straight-chain or branched. Preferably, it is straight-chain, especially 2-oxapropyl (=methoxymethyl), 2-oxabutyl (=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, 2-, 3-, 4-, 5-, 6-, 7-, 8- or 9-oxadecyl.

Preferred branched radicals for $R^1$, $R^2$, $R^3$ and/or $R^5$, each independently, are isopropyl, 2-butyl (=1-methylpropyl), isobutyl (=2-methylpropyl), 2-methylbutyl, isopentyl (=3-methylbutyl), 2-methylpentyl, 3-methylpentyl, 2-ethylhexyl, 2-propylpentyl, 2-octyl, isopropoxy, 2-methylpropoxy, 2-methylbutoxy, 3-methylbutoxy, 2-methylpentoxy, 3-methylpentoxy, 2-ethylhexoxy, 1-methylhexoxy, 2-octyloxy, 2-oxa-3-methylbutyl, 3-oxa-4-methylpentyl, 4-methylhexyl, 2-nonyl, 2-decyl, 2-dodecyl, 6-methyloctoxy, 6-methyloctanoyloxy, 5-methylheptyloxycarbonyl, 2-methylbutyryloxy, 3-methylvaleryloxy, 4-methylhexanoyloxy, 2-chloropropionyloxy, 2-chloro-3-methylbutyryloxy, 2-chloro-4-methylvaleryloxy, 2-chloro-3-methylvaleryloxy, 2-methyl-3-oxapentyl, 2-methyl-3-oxahexyl.

$R^5$ can also have one of the meanings given for $R^4$-P-X- above. In the case where $R^5$ is an—optionally substituted— alkyl radical, $R^4$ preferably is a vinyl or acrylate group while in cases where $R^5$ is $R^4$-P-X, all meanings given above for $R^4$ are preferred.

The inventive display exhibits two opposite plates, hereinafter terms substrates, which are transparent to light and which comprise electrodes on the opposing sides, said electrodes being manufactured from for example, $In_2O_3.S_nO_2$. On each electrode there is provided an orientation layer of, for example, rubbed polyimide or polyamide, by means of which the liquid-crystalline material according to the invention can be homogeneously aligned between the electrodes. The cell is manufactured by arranging the substrates thus formed and provided with electrodes, closing the apertures by, for example, a ring-shaped member, and filling the space between the substrates and the ring with a liquid-crystalline material according to the invention. In practice, a bonding layer of an epoxy compound can be used instead of the ring.

The liquid-crystalline material can be capillary filled between two substrates, provided with electrode layers, and then subsequently cured, for example, by irradiation with UV light, preferably in the presence of a photoinitiator, for example, an Igracure®. Another possible, but less attractive, technique comprises coating the LC material on a substrate with subsequent curing. The film may be peeled off and arranged between 2 substrates provided with electrode layers. It is also possible that the substrate onto which the LC material is applied exhibits an electrode layer so that the electrooptical system can be obtained by applying a second electrode layer and, optionally, a second substrate onto the coated and cured film.

The electrooptical system according to the invention can be operated reflectively or transmissively so that at least one electrode and, if present, the associated substrate are transparent. Both systems customarily contain no polarizers, as a result of which a distinctly higher light transmission results and is a considerable technological simplification in the production of these systems compared with conventional liquid-crystal systems such as, for example, TN or STN cells.

In general, a nematic liquid crystal of positive dielectric anisotropy is desirable because these mixtures could be used in devices in which it is essential to electrically switch a thin film of such a mixture into a homeotropic alignment (field on state) and therefore appear clear to transparent, while the off state would usually be determined by the alignment within the cell, which is usually homogenous. This would give either a focal conic (slightly scattering) or grandjean (colored). It is possible that, depending on how the voltage is applied or removed, one can flip into either the colored grandjean or the slightly scattering focal conic state in the field off state. Moreover, by adding a small amount of a reactive liquid crystal, each state can be stabilized to give a bistable device with one stage being colored (grandjean texture) or essentially clear or slightly light scattering (focal conic). When placed against a blank background, a contrast between colored and black is clearly seen. The color is dependent on the pitch length of the cholesterin helix according to the equation $$\lambda_{max} = \bar{n} \, P \sin \theta$$

wherein $\bar{n}$ is the mean refractive index of the LC,

P is the pitch length, and

θ is the viewing angle.

The pitch length obtained when adding a chiral dopant to a nematic host depends on the polarizing ability of the LC molecules—the more polarizable they are the tighter the pitch length obtained (higher twisting power). So, using a non-polar host may significantly alter how much chiral dopant would be needed to produce a given color.

Another application for this "blend" of chiral components is to mix them with reactive liquid crystals (for example, of formula II) and produce a chiral colored reactive LC mixture which can be coated into a thin film and polymerized by UV light to give a thin polymer film which is colored. It would preferably contain 20–30% non-reactive chiral LC as above. Therefore, the polymer content is preferably 70–80%.

The rise time increases accordingly as the cell thickness increases. But, the decay time remains constant. The decay time decreases rapidly accordingly as the content of network molecules increases. Consequently, it is not the thickness of the cell that counts, but the average distance between the network molecules. This explains the short decay times in comparison with the decay times (a few hundred milliseconds) in normal nematic cells. More particularly, decay times of a few milliseconds can be obtained.

The liquid-crystalline materials according to the invention are in particular suitable for liquid-crystal devices for show windows which have a dimmer layer made of a transparent solid material and said liquid-crystalline material between a pair of substrates each provided with an electrode layer. These devices operate in reverse mode and at lower potential. They exhibit lower hysteresis and improved electrooptical characteristics. Each substrate has an orientation film on it. The liquid-crystalline material exhibits, preferably, a helical pitch of 0.5–5 μm, and a dimmer layer thickness of 12–40 μm.

The invention will be explained in more detail by means of the following examples of the preparation of a liquid-crystalline material according to the invention.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosure of all applications, patents and publications, cited above and below, and of corresponding European application EP 93110687.6, filed Jul. 5, 1993, are hereby incorporated by reference.

EXAMPLES

Example 1

A display cell is composed of two opposite plates, each of which is transparent to light and is provided with an electrode of a material which is transparent to light and with rubbed polyimide layers. In the cell there was provided a liquid-crystalline material consisting of materials (a) and (b), for which purpose 5% of a diacrylate is used, represented by formula IIA1a (known under the indication C6H). The diacrylate is added to 95 parts of the following liquid-crystalline material:

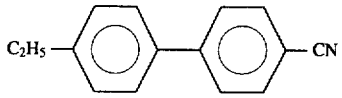
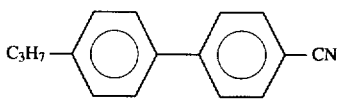
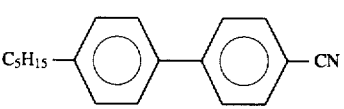
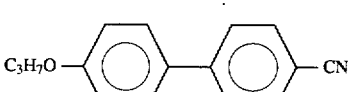
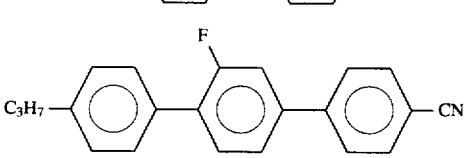
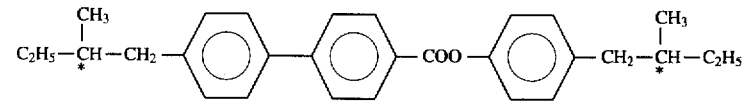
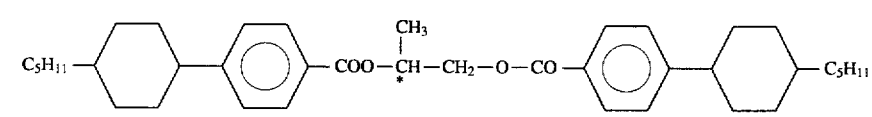

with a clearing point of 102° C. and $\Delta n=0.2494$.

A photoinitiator in a quantity of 1 part by weight is added to said mixture, i.e., Igracure 651, marketed by Ciba Geigy. The provision takes place by capillarity (under the influence of the surface tension). The orientation being achieved by pre-coating the glass plates with polyimide rubbed undirectionally. After said orientation, the liquid-crystalline material is exposed to UV light (TLO9-Philips), so that a skeleton is formed on the basis of the acrylate of formula (IIA1a), which skeleton is present as a continuous phase within the material (b). It preserves the orientation independent of the field applied and the influences to which the liquid-crystalline material (b) is subjected.

Example 2

A display cell was composed analogously to Example 1 with 95 parts of a liquid-crystalline material consisting of a mixture of

| Structure | Percentage |
|---|---|
| 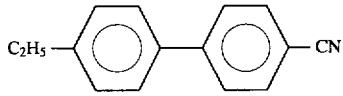 C₂H₅—⟨⟩—⟨⟩—CN | 8.22% |
| 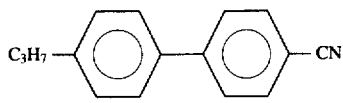 C₃H₇—⟨⟩—⟨⟩—CN | 6.195% |
| 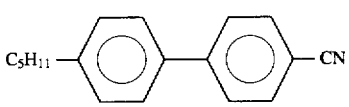 C₅H₁₁—⟨⟩—⟨⟩—CN | 28.085% |
| 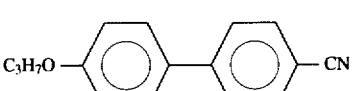 C₃H₇O—⟨⟩—⟨⟩—CN | 8.905% |
| 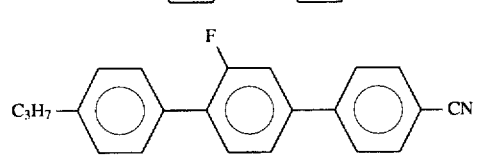 C₃H₇—⟨⟩—⟨F⟩—⟨⟩—CN | 17.125% |
| 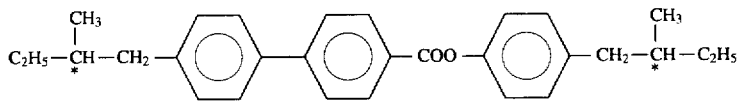 C₂H₅—CH(CH₃)—CH₂—⟨⟩—⟨⟩—COO—⟨⟩—CH₂—CH(CH₃)—C₂H₅ | 15% |
| 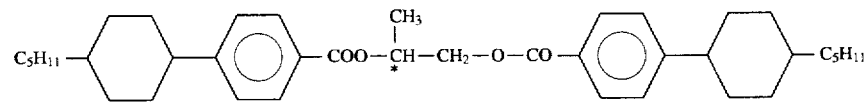 C₅H₁₁—⟨cyc⟩—⟨⟩—COO—CH(CH₃)—CH₂—O—CO—⟨⟩—⟨cyc⟩—C₅H₁₁ | 3.5% |
| 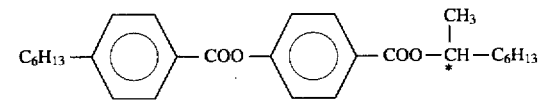 C₆H₁₃—⟨⟩—COO—⟨⟩—COO—CH(CH₃)—C₆H₁₃ | 3% |
| 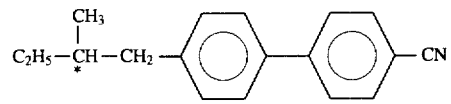 C₂H₅—CH(CH₃)—CH₂—⟨⟩—⟨⟩—CN | 10% | with clearing point of 82.5° C., Δn=0.2443.

Example 3

A display cell was composed analogously to Example 1 with 95 parts of a liquid-crystalline material consisting of a mixture of

| Structure | Percentage |
|---|---|
| 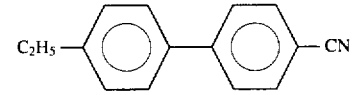 C₂H₅—⟨⟩—⟨⟩—CN | 10.275% |
| 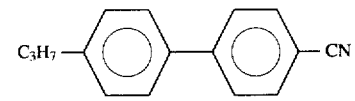 C₃H₇—⟨⟩—⟨⟩—CN | 3.425% |
| 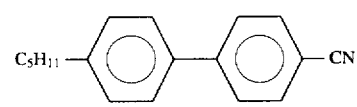 C₅H₁₁—⟨⟩—⟨⟩—CN | 25.345% |

| | |
|---|---|
| 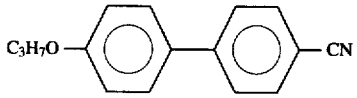 | 7.535% |
| 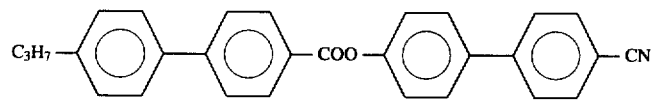 | 4.795% |
| 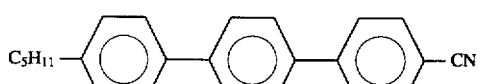 | 6.85% |
| 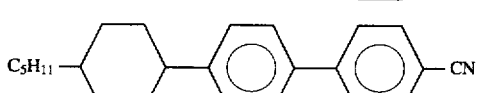 | 10.275% |
| 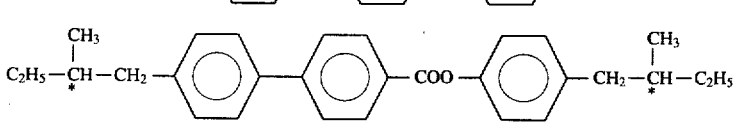 | 15% |
| 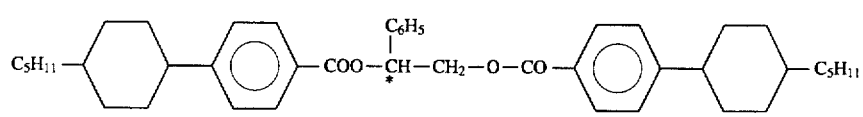 | 3.5% |
| 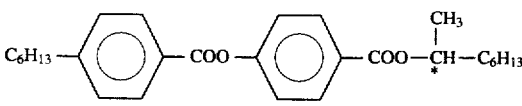 | 3% |
| 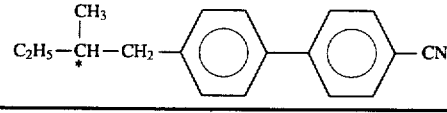 | 10% |
with clearing point of 58° C., Δn=0.2436.
Example 4
A display cell was composed analogously to Example 1 with 95 parts of a liquid-crystalline material consisting of a mixture of
| | |
|---|---|
| 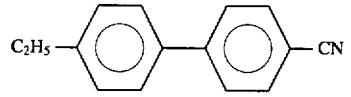 | 12.45% |
| 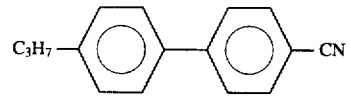 | 4.15% |
| 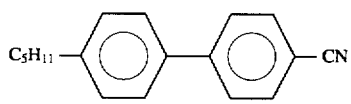 | 30.71% |
| 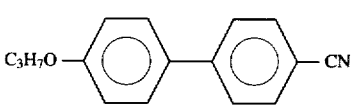 | 9.13% |

-continued

| Structure | % |
|---|---|
| C₃H₇—⌬—⌬—COO—⌬—⌬—CN | 5.81% |
| C₅H₁₁—⌬—⌬—⌬—CN | 8.30% |
| C₅H₁₁—⬡—⌬—⌬—CN | 12.45% |
| C₂H₅—CH(CH₃)—CH₂—⌬—⌬—COO—⌬—CH₂—CH(CH₃)—C₂H₅ | 15% |
| C₅H₁₁—⬡—⌬—COO—CH(C₆H₅)—CH₂—O—CO—⌬—⬡—C₅H₁₁ | 2% | with clearing point of 72.8° C., Δn=0.2485.

Example 5

A display cell was composed analogously to Example 1 with 98 parts of a liquid-crystalline material consisting of a mixture of

| Structure | % |
|---|---|
| C₂H₅—⌬—⌬—CN | 16.74% |
| C₃H₇O—⌬—⌬—CN | 6.20% |
| C₅H₁₁O—⌬—⌬—CN | 7.44% |
| C₅H₁₁—⬡—⌬—⌬—CN | 6.20% |
| C₅H₁₁—⌬—⌬—⌬—CN | 3.10% |
| C₃H₇—⌬—⌬—⌬—CN | 12.40% |
| C₃H₇—⌬—⌬—COO—⌬—⌬—CN | 1.86% |
| C₅H₁₁—⬡—⌬—⌬—C₃H₇ | 1.86% |

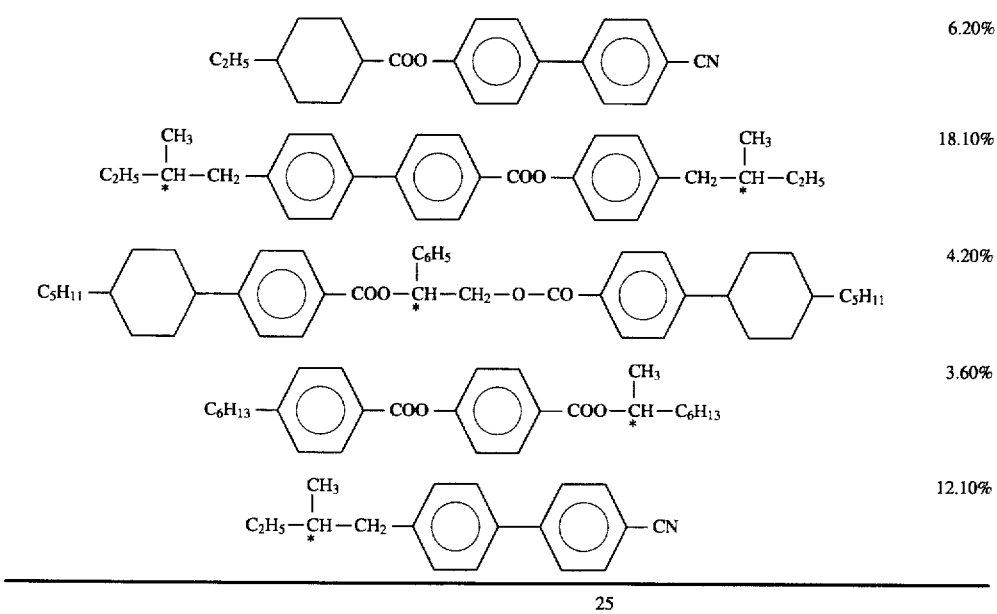
| | |
|---|---|
| | 6.20% |
| | 18.10% |
| | 4.20% |
| | 3.60% |
| | 12.10% |
with clearing point of 98° C.
Example 6
A chiral pre-mixture consisting of
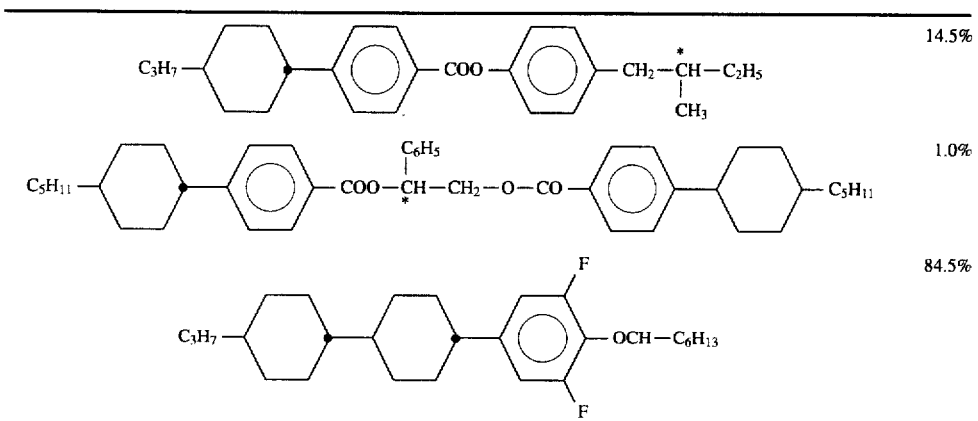
| | |
|---|---|
| | 14.5% |
| | 1.0% |
| | 84.5% |
exhibits Ch-I 86° C., HTP 10.69.
Example 7
A chiral pre-mixture consisting of
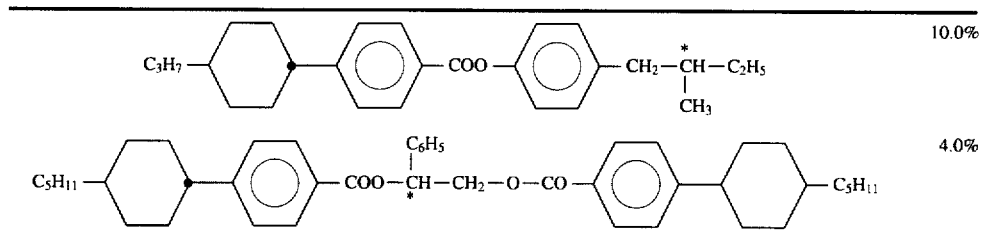
| | |
|---|---|
| | 10.0% |
| | 4.0% |

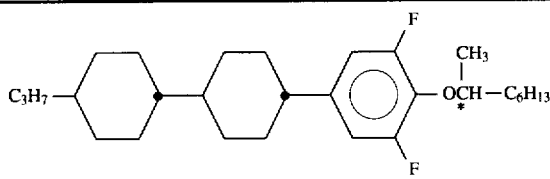 56.0%
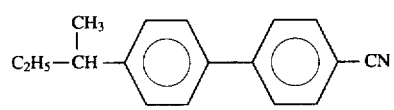 30.0%
exhibits Ch-I 27° C., HTP 10.27.
Example 8
A chiral composition is formulated by admixing 73% of a nematic base mixture consisting of
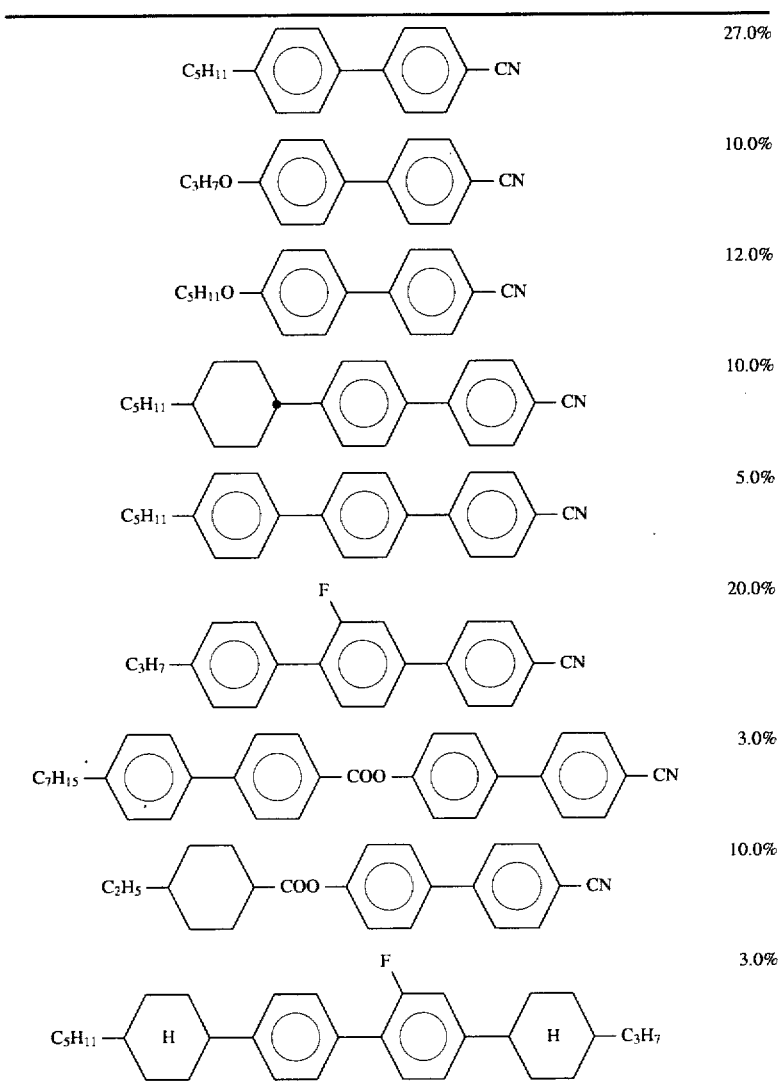
and 27% of the chiral pre-mixture of Example 6.
The resulting cholesteric mixture exhibits the following properties:
K<−20 Ch 117 I
$\lambda_{max}$ 580 nm
A display cell was composed with the aid of this cholesteric mixture analogously to Example 1.

Example 9

A chiral composition is formulated by admixing 73% of a nematic base mixture consisting of

| Structure | % |
|---|---|
| $C_2H_5$–⌬(F)–$CH_2CH_2$–⌬–⌬–Cl | 12.25% |
| $C_3H_7$–⌬(F)–$CH_2CH_2$–⌬–⌬–Cl | 6.30% |
| $C_5H_{11}$–⌬(F)–$CH_2CH_2$–⌬–⌬–Cl | 16.45% |
| $C_3H_7$–⌬–⌬(F)–⌬(F)–Cl | 11.00% |
| $C_5H_{11}$–⌬–⌬(F)–⌬(F)–Cl | 12.00% |
| $C_3H_7$–⌬–⌬(F)–⌬(F)–F | 7.0% |
| $C_5H_{11}$–(cyclohexyl)–⌬–⌬–CN | 15.00% |
| $C_3H_7$–⌬–⌬(F)–⌬–CN | 15.00% |
| $C_5H_{11}$–⌬–⌬–⌬–CN | 5.0% | and 27% of the chiral pre-mixture of Example 6.

The resulting cholesteric mixture exhibits the following properties:

K<−20 Ch 115 I $\lambda_{max}$ 564 nm

A display cell was composed with the aid of this cholesteric mixture analogously to Example 1.

Example 10

A display cell was composed analogously to Example 1 with 95 parts of a liquid-crystalline material consisting of a mixture of

| Structure | % |
|---|---|
| $C_2H_5$–⌬–⌬–CN | 6.60% |

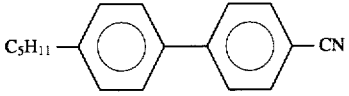 25.70%

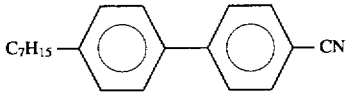 6.60%

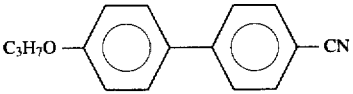 3.40%

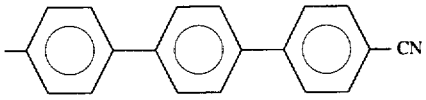 4.00%

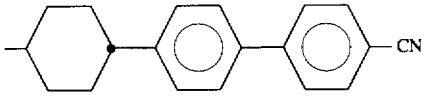 6.00%

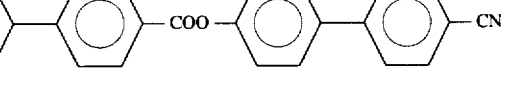 2.00%

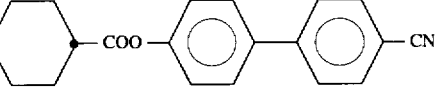 6.00%

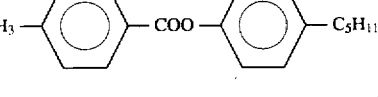 6.70%

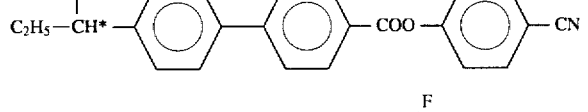 5.00%

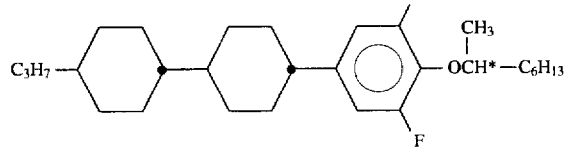 18.00%

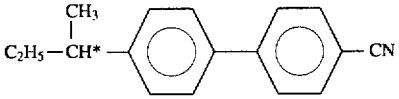 10.00% with

K<4 Ch 73.4 I and $\lambda_{max}$ 560 nm.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A liquid-crystalline anisotropic gel material comprising:

a polymerized liquid-crystalline material (a), and a low-molecular weight liquid-crystalline material (b), wherein said polymerized material (a) forms a permanently oriented network within said low-molecular weight liquid-crystalline material (b)

said low-molecular weight liquid-crystalline material (b) comprises:

at least one achiral mesogenic compound of formula I $$R^1\text{-}(A^1\text{-}Z^1)_o\text{-}A^2\text{-}R^2 \qquad (I)$$

wherein
- $R^1$ and $R^2$ are each, independently, straight-chained or branched alkyl or alkenyl with up to 16 C atoms in which one or two non-adjacent $CH_2$ groups may be replaced by —O—, —CO—O—, —O—CO— or —O—CO—O—, one of $R^1$ and $R^2$ may also be H, F, Cl, $CF_3$, $OCF_3$, $OCF_2H$ or CN;
- $A^1$ and $A^2$ are each, independently, optionally fluorinated 1,4-phenylene in which one or two CH groups may be replaced by N or 1,4-cyclohexylene in which one or two non-adjacent $CH_2$ groups may be replaced by O;
- $Z^1$ is —CO—O—, —O—CO—, —OCH$_2$—, —CH$_2$CH$_2$—, —C≡C—, —C≡C—C≡C— or a single bond; and
- o is 1, 2 or 3;

at least one chiral mesogenic compound of formula IV

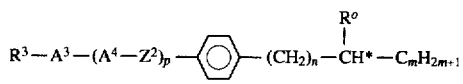  (IV)

wherein
- $R^o$ is $CH_3$, $C_6H_5$, F, Cl, CN or $CF_3$;
- n is 0, 1 or 2;
- m is 1, 2, 3, 4, 5, 6, 7, 8, 9 or 10;
- $R^3$ is straight-chained or branched alkyl or alkenyl with up to 16 C atoms in which one or two non-adjacent $CH_2$ groups may be replaced by —O—, —CO—O—, —O—CO— or —O—CO—O—, $R^3$ can also be H, F, Cl, $CF_3$, $OCF_3$, $OCF_2H$ or CN;
- $A^3$ and $A^4$ are each, independently, optionally fluorinated 1,4-phenylene in which one or two CH groups may be replaced by N or 1,4-cyclohexylene in which one or two non-adjacent $CH_2$ groups may be replaced by O;
- $Z^2$ is —CO—O—, —O—CO—, —OCH$_2$—, —CH$_2$O—, —CH$_2$CH$_2$—, —C≡C—, —C≡C—C≡C— or a single bond; and
- p is 0, 1 or 2; and at least one chiral mesogenic compound selected from formulae V–VII:

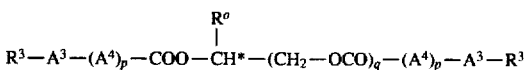 (V)

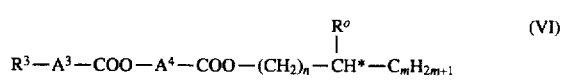 (VI)

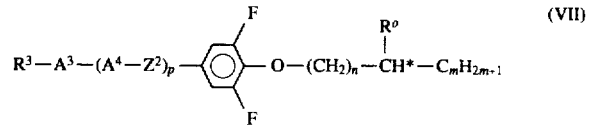 (VII)

wherein $R^3$, $R^o$, $A^3$, $A^4$, $Z^2$, n, m and p have the meanings defined above, and q is 0 or 1.

2. A liquid-crystalline anisotropic gel material according to claim 1, wherein $R^o$ is $CH_3$ in formulae IV, VI, VII and $R^o$ is $C_6H_5$ in formula V.

3. A liquid-crystalline anisotropic gel material according to claim 1, wherein material (b) contains at least one chiral compound selected from the formulae IVa or IVb

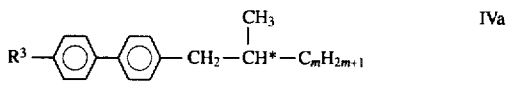 IVa

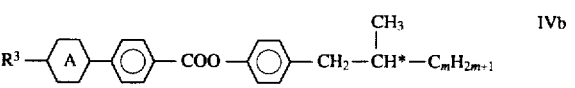 IVb wherein
- $R^3$ is straight-chained or branched alkyl or alkenyl with up to 16 C atoms in which one or two non-adjacent $CH_2$ groups may be replaced by —O—, —CO—O—, —O—CO— or —O—CO—O—, $R^3$ can also be H, F, Cl, $CF_3$, $OCF_3$, $OCF_2H$ or CN, and
- m is 1, 2, 3, 4, 5, 6, 7, 8, 9 or 10; and at least one chiral compound selected from formulae Va, Vb, VIa or VIIa:

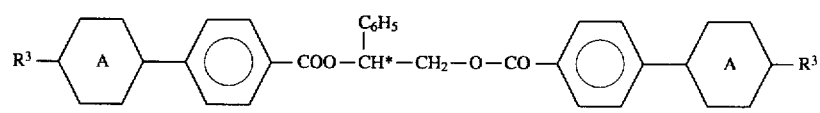 Va

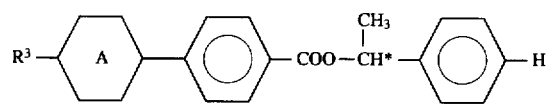 Vb

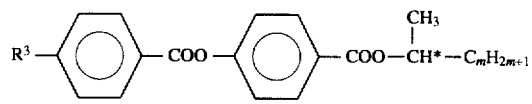 VIa

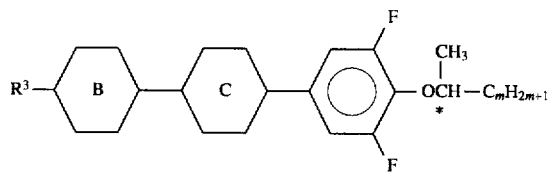 VIIa wherein

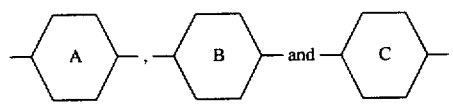

are each independently

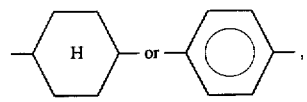

and $R^3$ and m have the meanings given above.

4. A liquid-crystalline anisotropic gel material according to claim 1, wherein said at least one achiral mesogenic compound is selected from formulae Ia, Ib or Ic

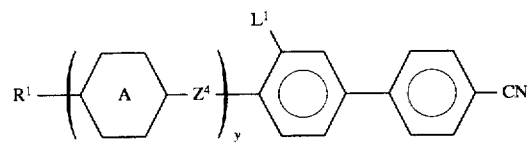 (Ia)

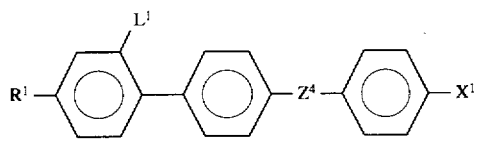 (Ib)

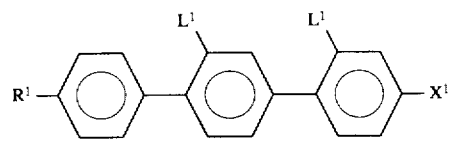 (Ic)

wherein $R^1$ is straight-chained or branched alkyl or alkenyl with up to 16 C atoms in which one or two non-adjacent $CH_2$ groups may be replaced by —O—, —CO—O—, —O—CO— or —O—CO—O—, $R^1$ can also be H, F, Cl, $CF_3$, $OCF_3$, $OCF_2H$ or CN;

$L^1$ is H or F;

$X^1$ is F or Cl;

$Z^1$ is —COO—, —$CH_2CH_2$— or a single bond;

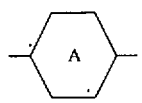

is

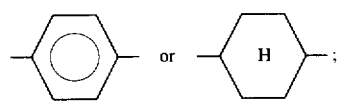

and

Y is 0, 1 or 2.

5. A liquid-crystalline anisotropic gel material according to claim 4, wherein said material (b) contains at least one achiral compound selected from formulae Ia1–Ia4, Ib1, Ic1 or Ic2:

 Ia1

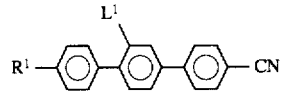 Ia2

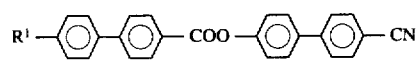 Ia3

 Ia4

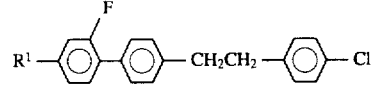 Ib1

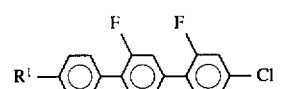 Ic1

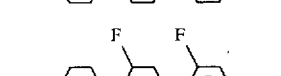 Ic2 wherein $R^1$ is straight-chained or branched alkyl or alkenyl with up to 16 C atoms in which one or two non-adjacent $CH_2$ groups may be replaced by —O—, —CO—O—, —O—CO— or —O—CO—O—, $R^1$ can also be H, F, Cl, $CF_3$, $OCF_3$, $OCF_2H$ or CN; and $L^1$ is H or F.

6. A liquid-crystalline anisotropic gel material according to claim 1, wherein said material (b) consists essentially of:

50–88 wt. % of at least one compound of formula I;

1–30 wt. % of at least one compound of formula IV; and 0.1–10 wt. % of at least one compound selected from formulae V and VI.

7. A liquid-crystalline anisotropic gel material according to claim 1, wherein said material (b) consists essentially of:

50–88 wt. % of at least one compound of formula I;

1–30 wt. % of at least one compound of formula IV; and

1–30 wt. % of at least one compound of formula VII.

8. A liquid-crystalline anisotropic gel material according to claim 1, wherein said material (b) consists essentially of:

50–88 wt. % of at least one compound of formula I;

1–30 wt. % of at least one compound of formula IV;

0.1–10 wt. % of at least one compound selected from formulae V and VI; and

1–30 wt. % of at least one compound of formula VII.

9. A liquid-crystalline anisotropic gel material according to claim 1, wherein said material (b) contains at least one chiral mesogenic compound containing a structural element of formula 4

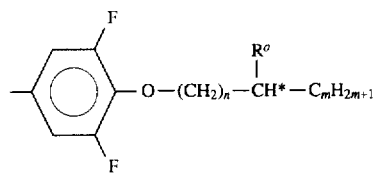 (4)

wherein $R^o$ is $CH_3$, $C_6H_5$, F, Cl, CN or $CF_3$, n is 0, 1 or 2, and m is 1, 2, 3, 4, 5, 6, 7, 8, 9 or 10.

10. A display cell comprising:

two opposite plates, each of which is transparent to light, as substrates, said plates are provided with an electrode, made of a material transparent to light, on their sides facing each other, said electrode carrying an orientation layer;

a sealing material provided between the ends of said plates; and a liquid-crystalline material in the space between said plates and sealing material, wherein said liquid-crystalline material is an anisotropic gel material comprising:

a polymerized liquid-crystalline material (a), and a low-molecular weight liquid-crystalline material (b), wherein said polymerized material (a) forms a permanently oriented network within said low-molecular weight liquid-crystalline material (b), said low-molecular weight liquid-crystalline material (b) exhibits a cholesteric phase and is a liquid-crystalline medium comprising at least one chiral mesogenic compound comprising a structural element of formula 1 and at least one other chiral mesogenic compound comprising a structural element from formulae 2–4:

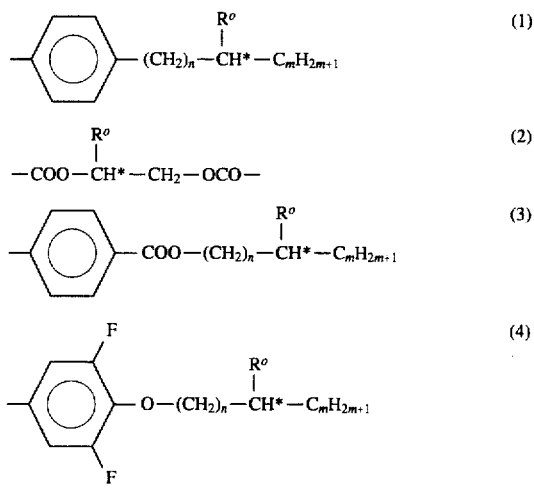

wherein
$R^o$ is $CH_3$, $C_6H_5$, F, Cl, CN or $CF_3$,
n is 0, 1 or 2, and
m is 1, 2, 3, 4, 5, 6, 7, 8, 9 or 10.

* * * * *